Nov. 3, 1931.  E. B. CARNS  1,829,922
WING FOR AIRCRAFT
Filed March 31, 1927  4 Sheets-Sheet 1
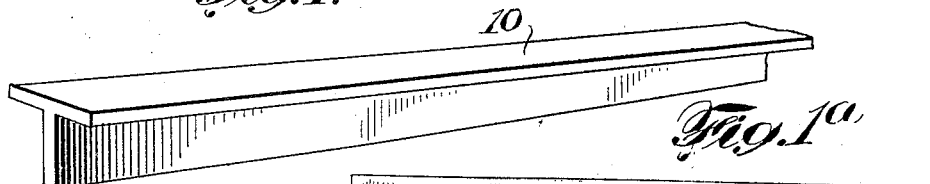
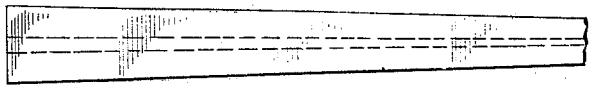
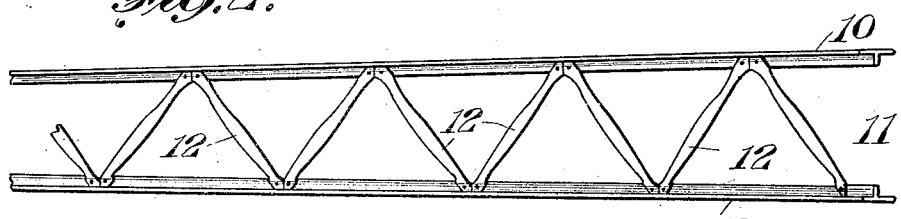
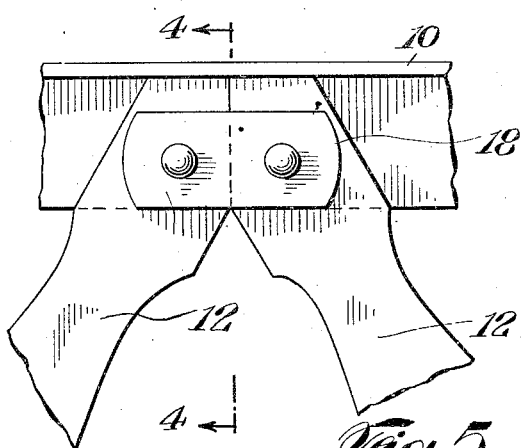
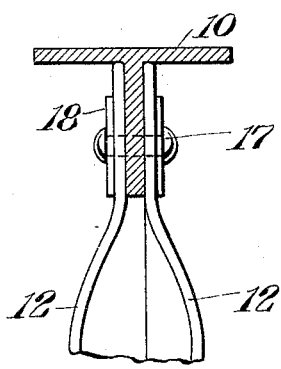
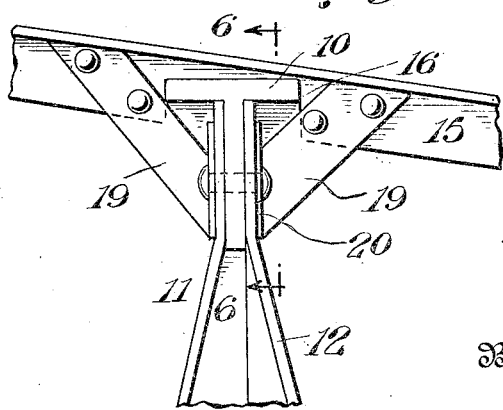
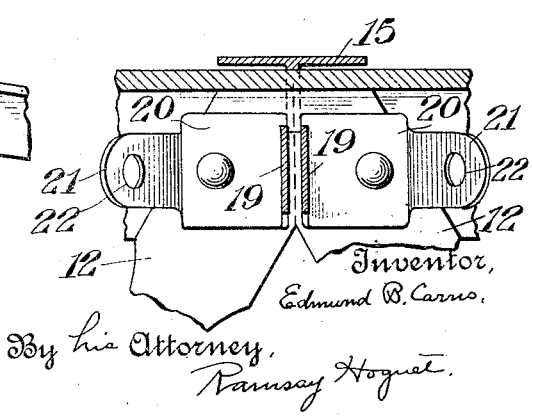
Inventor,
Edmund B. Carns.
By his Attorney.
Ramsay Hoguet.

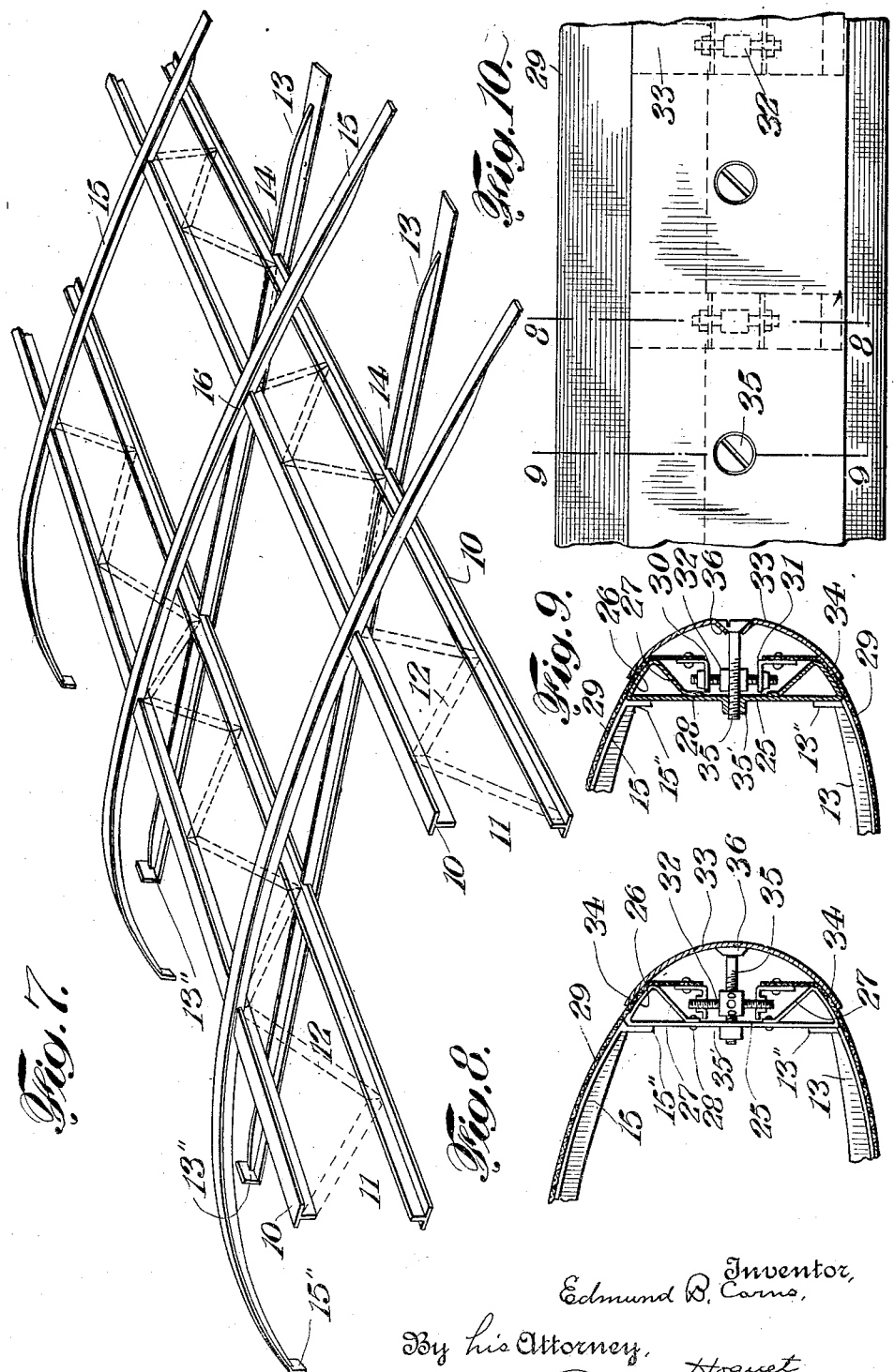

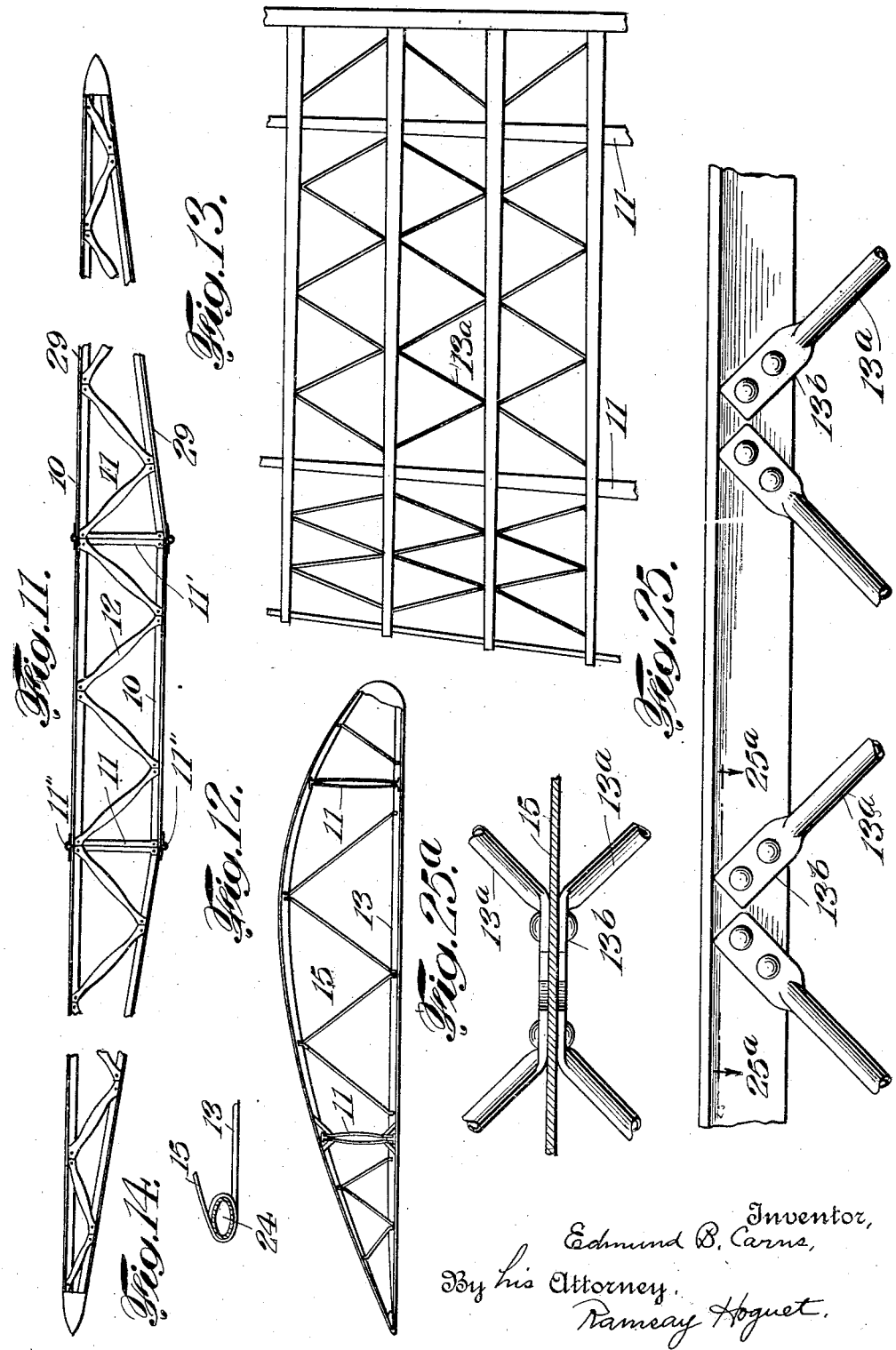

Nov. 3, 1931.  E. B. CARNS  1,829,922
WING FOR AIRCRAFT
Filed March 31, 1927    4 Sheets-Sheet 4
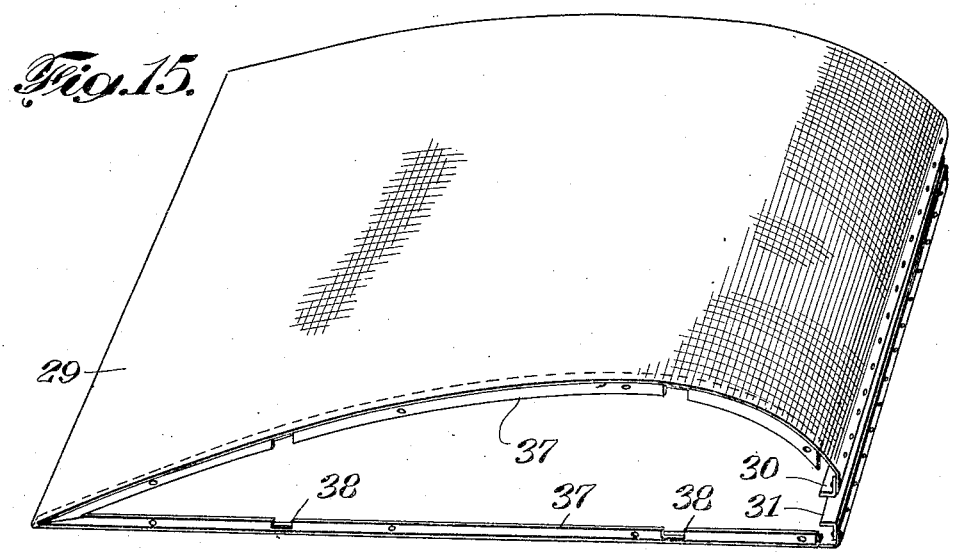
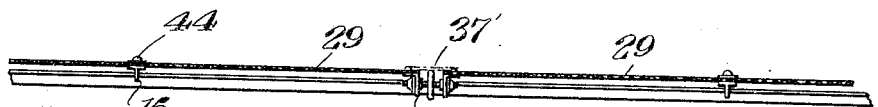
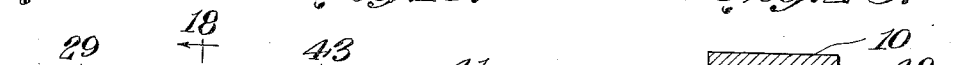
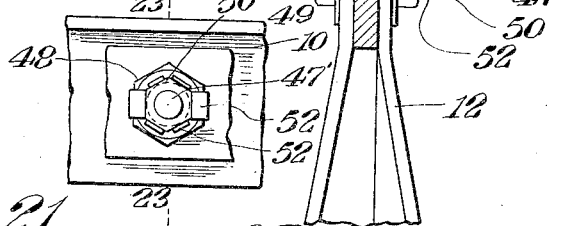
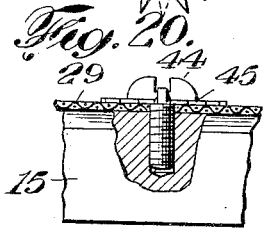
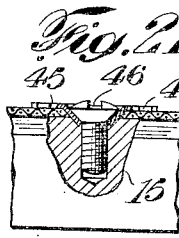
Inventor,
Edmund B. Carns,
By his Attorney,
Ramsay Hoguet Patented Nov. 3, 1931

1,829,922

UNITED STATES PATENT OFFICE

EDMUND B. CARNS, OF NEW YORK, N. Y., ASSIGNOR TO CAIRNS DEVELOPMENT COMPANY, OF WILMINGTON, DELAWARE, A CORPORATION OF DELAWARE

WING FOR AIRCRAFT

Application filed March 31, 1927. Serial No. 179,937.

My invention relates to improvements in aircraft. The essential characteristics of a successful wing for aircraft are lightness, great strength as compared to the weight and durability.

The object of my invention is generally to produce an aircraft wing embodying to the greatest extent the foregoing desirable characteristics.

My invention is further intended to produce a wing which is adaptable for use on any aircraft and which is constructed in such a way that commercial means of quantity production can readily be applied to producing this wing and its parts.

My invention is further intended to produce a wing in which all the component parts grow lighter in weight toward the wing tips or edges and in which the important parts are tapered so that the wing as a whole has its parts disposed and arranged to make a perfectly balanced wing with no waste of metal weight and with the ratio of weight properly proportioned to the stress likely to be placed on any given part. Thus I can if desired produce a wing having a thick mid-section but still very light.

My invention is also intended to produce a wing especially adapted for use in connection with a flexible metallic skin or cover which can be made of wire mesh having a coherent metallic surface, and parts of my wing are arranged and constructed so that such a cover can be stretched drum-tight upon the wing, and will not become displaced, wrinkled or disturbed under variations of temperature and moisture.

My invention comprises other details of construction which conduce to the formation of a light, strong, durable wing.

Reference is to be had to the accompanying drawings, in which similar reference characters represent corresponding parts in all views.

Fig. 1 is a detail perspective of a member employed as a base member in the construction of the wing trusses and ribs.

Fig. 1a is a broken plan of the member shown in Fig. 1.

Fig. 2 is a broken side elevation of one of the spar members.

Fig. 3 is a broken enlarged detail showing how the strut and rib members of the spar are united.

Fig. 4 is a cross-section on the line 4—4 of Fig. 3.

Fig. 5 is a detail showing the means of connecting the rib and strut members of the frame.

Fig. 6 is a cross-section on the line 6—6 of Fig. 5.

Fig. 7 is a broken perspective showing the frame assembly of the wing.

Fig. 8 is a section on the line 8—8 of Fig. 10 showing the nose piece connection with the wing and the means for tightening the skin or cover.

Fig. 9 is a section on the line 9—9 of Fig. 10.

Fig. 10 is a broken front view of the wing.

Fig. 11 is a broken longitudinal section of the wing.

Fig. 12 is a broken cross-section of the wing.

Fig. 13 is a detail illustrating some of the wing bracing.

Fig. 14 is a detail showing the connection between the ribs and the trailing edge of the wing.

Fig. 15 is a perspective showing one of the skin or cover sections and its means for connection with the frame.

Fig. 16 is a broken sectional elevation showing the means for connecting the skin or cover sections.

Fig. 17 is a detail section showing the means for drawing together the adjacent skin sections.

Fig. 18 is a cross-section on the line 18—18 of Fig. 17.

Fig. 19 is a view of a nut-lock washer usable in connection with the skin fastenings.

Fig. 20 is a detail showing the application of the washer.

Fig. 21 is a view similar to Fig. 20, but showing the further movement of the nut-locking washer.

Fig. 22 is a broken face view showing a preferred means of connecting the struts and spar members.

Fig. 23 is a broken section on the line 23—23 of Fig. 22.

Fig. 24 is a detail of a nut-locking member, the use of which is illustrated in Fig. 23.

Fig. 25 is a broken enlarged detail showing modified connections between the ribs and their braces.

Fig. 25a is a section on the line 25a—25a of Fig. 25.

As the basis for my wing construction, I use T's 10 of generally conventional shape. These are employed for the top and bottom portions of the spars 11 and also for the cross-ribs of the frame but these T's instead of being entirely conventional are tapered towards the ends, preferably by thinning the web member and also by narrowing the flange. Thus on the spars 11 which run the whole length of the frame or wing, the top and bottom members of each spar are tapered from the center to the wing tips and the spars are tapered as a whole as shown in Fig. 11. The necessary qualities of strength and lightness are conserved and the weight of metal is where it is most needed. In other words, the weight of the metal will be adapted to the stresses at any special point and the spars will be nicely balanced.

These spar members 11 are in the form of trusses and the upper and lower members are connected by struts 12 which are likewise tapered from the middle to the end portions and, obviously, the struts will be longer in the middle part of the spar than towards the ends. As these spar members are long, they can, if desired, be made up in sections as shown in Fig. 11, in which the several sections have abutting angles 11′ which can be fastened together in any suitable or preferred way and preferably project through the top and bottom of the wing, as shown at 11″ where they can be pinned or otherwise fastened together.

The particular form of strut can, of course, be departed from, but I prefer to use the form illustrated, generally, and which I have covered by a separate application for Letters Patent, filed March 5, 1927, S. N. 173,087. These struts which go to make the spar in the form of a truss are diagonally disposed, as shown in Figs. 2 and 7, and they are placed with reference to the cross-ribs 13 and 15, so that the ribs will be opposite the mating points of two struts, thus further conserving strength. In Fig. 7 every other rib is omitted for clearness from both top and bottom. The ribs 13 on the underside of the wing are recessed as at 14 to fit over and make a firm and snug contact with the lower spar members, while the upper ribs 15 are shaped to the cross-sectional contour of the wing and are likewise recessed as at 16, so as to fit snugly upon the upper spar members. By reference to Fig. 7, it will be seen that the upper and lower ribs are staggered with relation to each other and that they taper in both dimensions toward their tips. Thus with the spar and rib members as well as their components growing lighter toward the wing tips and edges, the wing as a whole possesses remarkable stability, rigidity, and lightness.

In Figs. 3 and 4, I have shown how the strut members 12 mate at the web of the members 10 of the spars, and at this point the matting struts are beveled as shown, so that they will fit snugly together and they are united by plates 18 which are riveted, as shown at 17, to the webs of the members 10. The struts are also rigidly and very securely attached to the ribs 13 and 15, as shown in Figs. 5 and 6, the connection being substantially the same on top and bottom. In the figures referred to I have shown a preferred means of attaching. The upper part of the strut is attached to the spar member 10 and likewise the lower part is also connected, and the connection between the ribs 15 or 13 is by means of braces 19, which are riveted or otherwise fastened to the web of a rib and converge upon the upper part of a strut. The ribs 13 and 15 can be further braced by the members 13a as shown in Figs. 25 and 25a. These are preferably tubular, having their ends flattened and they extend between the upper and lower ribs, the parts which are attached to the ribs being flattened as shown in 13b.

At the trialing edge of the wing frame is a flattened tubular cross-piece 24, which affords a light, strong and preferred means of securing the rear ends of the ribs 13 and 15. This is shown best in Fig. 14. The upper rib 15 has its flanged member prolonged and bent around the tubular member 24, as shown at 15′, while each lower rib 13 has a similar flanged end 13′ prolonged and likewise bent upward around the member 24. The bent portions of the ribs can be pinned, welded or otherwise additionally secured to the tubular cross-piece, if desired. The front ends of the ribs 13 and 15 do not come into alignment but are spaced to provide for convenient means of attaching the skin or covering of the wing and for adjusting the same, and also to provide for the attachment of the nose-piece. To this end the flange members of the ribs 13 and 15 are turned inward, as shown at 13″ and 15″ (see Figs. 8 and 9), and these inturned flanges abut with a cross-strip or plate 25, the upper and lower edges of which are bent outward as at 26, and then inward as at 27, the inner edges being riveted as at 28 to the body of the plate 25, and thus hollow triangular abutments are produced at the upper and lower extremities of the plate 25, which abutments on their outer sides conform to the contour of the upper and lower parts of the wing and serve as fulcrums, over which the upper and lower members of the skin or cover can be stretched.

The skin or cover 29 is preferably in transversely separated sections, a separate section being shown in Fig. 15, and the skin extends over the trailing end of the frame and along the top and bottom. The cover 29 is preferably a flexible metal fabric and can be a wire mesh, having a sheet surface deposited on one face thereof. Such a fabric is not here claimed, but it is most desirable. At the front edges the skin is preferably provided with transverse angles 30 and 31, which are firmly secured to the skin and are spaced apart, the inwardly extending parts connecting by turn buckles 32, or equivalent means, so that when the angles 30 and 31 are drawn towards each other by the turn buckles, the skin 29 on the upper and lower sides of the frame will be drawn inward over the abutments at the ends of the plates 25.

The gap between the upper and lower skin surfaces at the front end of the wing is covered by a nose-piece 33 of the desired contour, which clamps over the front edge portions of the skin, as shown at 34, and is fastened by a screw or an equivalent means 35, extending through a countersunk seat 36 in the nose-piece and threaded into a nut 35' on the plate 25.

The several skin sections are provided at their adjacent edges with angles 37 (see Figs. 15 and 16), the flanges of which extend inwardly and the adjacent angles are connected by a turn buckle or similar tightening device which, in the present instance, has a bolt 40 (see Fig. 17) oppositely threaded at its end portions, and the bolt is provided with a milled wheel 41 having holes 42 therein, which can be engaged by any pointed instrument to turn the wheel and the bolt and thus draw the several sections 29 snugly together. The cracks between the several sections can be covered by a sealing strip 37' as shown in Fig. 16. These strips 37' can also be soldered to the metallic cover or skin 29. The angles 37 above referred to are cut away at 38 so as to fit snugly over the spar members of the wing. To prevent any possible accidental turning of the turn buckle the several wheels 41 along the plane can be connected by a wire 43 extending through some of the holes 42, as shown in Fig. 17. The cover member or skin 29 is also fastened to the ribs 15 of the frame at necessary intervals, and this can be done by screws 44 turning in suitable tap holes in the ribs. In this connection, I also prefer to use a simple form of nut lock which will prevent any loosening of the screws. The metal washer 45 fits around the screw and this has radiating fingers 46. When the screw is turned home the body part of the washer is forced down into the countersunk portion made for the screw head, as shown in Fig. 21, and some of the fingers 46 will be in position to register with the slot in the screw and they are bent into this slot. The body of the washer is frictionally held and the fingers which engage the slot prevent the screw from loosening.

In Figs. 22 and 23 I have shown a suitable means of fastening the strut members 12 to the upper and lower members 10 of the spar 11. As illustrated, a bolt 47 extends through the mating parts of the strut and the web of the members 10, and a plate or washer 49 is placed next the strut ends and over the bolt. The outer extremities of the bolt are reduced as at 47' and the larger part of the bolt has nuts 48, while the smaller parts have lock nuts 50. A washer 51 is placed between the two nuts and this has arms 52 which can be doubled up so as to fit against the flat pieces of the outer nut and thus prevent it from turning, the body of the washer being bound frictionally by the nut.

From the foregoing description it will be seen that I have produced a wing for aircraft which can be made of the desired thickness but will be very light in proportion to its strength; that the wing is perfectly balanced and that it can be economically produced in a quantitive way, as much of the component material comprises stampings or structures which are substantially standard or can be easily produced.

I claim:

1. A wing for aircraft having longitudinally disposed spar members, transversely disposed in staggered relationship ribs engaging the upper and lower portions of the spars, struts engaging the upper and lower parts of each spar and braces fastened to the spar members and ribs, the reaction points of the strut members being opposite the aforesaid ribs.

2. A wing for aircraft comprising trussed spar members and transverse ribs upon the upper and lower parts of the spars, the upper and lower ribs being in staggered relation, and strut members engaging the upper and lower parts of each spar, the reaction points of the strut members being disposed opposite the upper and lower ribs and the strut members being attached to the ribs at these points.

3. In a wing for aircraft the frame comprising longitudinal spars, upper and lower ribs in staggered relation connecting with the spars, a longitudinal brace at the trailing edge of the frame, and a connection between the ribs and brace by which the rib ends are bent around the said brace.

4. In a structure of the kind described, the combination with a frame of a skin or cover enveloping the frame with the end portions of the skin separated, and turn buckle serving as a connecting element between said skin ends acting to draw the end portions of the skin together, thereby tightening it upon the frame.

5. An aircraft wing having a framework with opposite abutments on the upper and lower parts of its front edge portion, a skin or cover for the frame work extending inward over the said abutments, a threaded tensioning means connecting the end portions of the skin or cover and acting between said abutments to draw the skin taut over the said abutments, and a nose-piece forming the edge contour of the wing and fitting over the said front edge portion.

6. An aircraft wing having a skeleton framework blunted at the front edge, a transverse plate across said blunted edge part, abutments on the plate, a skin or cover for the frame having its end portions extending over the said abutments, an adjusting device for fastening the end portions of the skin or cover together, and a nose-piece forming the front edge contour of the wing and covering the front portions of the skin or cover.

7. An aircraft wing having a skeleton frame work blunted at the front edge, a cross-plate on said front edge portion having hollow abutments thereon forming a continuation of the upper and lower side contours of the frame, a cover or skin for the frame having its end portions extending over the said abutments, angles secured to the said skin or cover ends, a turn buckle connecting the angles, and a nose-piece secured to the cross-plate and forming the front edge contour of the wing.

8. A wing for aircraft comprising a skeleton frame, a metallic fabric cover for the frame separated near the frame edges and means connecting the separate end edges and acting to draw the cover drum tight upon the frame.

9. In a wing for aircraft, the combination with the spar members and the upper and lower rib members in staggered relation crossing and seating upon the spar members, of struts connecting the upper and lower ribs and braces connecting the ribs with the chord members of the spars, the said braces abutting at their adjacent ends and being secured to both rib and spar members.

10. In a wing for aircraft, the combination with the spars having upper and lower chord members of T cross section, of the transverse ribs in staggered relation of T cross section having their web portions recessed to seat on the chord members of the spars struts uniting the upper and lower ribs and braces connecting the ribs to the spars.

11. A wing beam having spars with upper and lower chord members tapering in form and wall thickness toward the wing tips, lattice elements being progressively diminished in all cross sectional dimensions toward the wing tips, and staggered ribs resting on said upper and lower chord members.

12. A wing beam having spars with upper and lower chord members tapering in section toward the wing tips and converging toward the wing tips, lattice elements connecting the upper and lower chord members, said elements being progressively diminished in all cross sectional dimensions toward the wing tips, and upper and lower ribs in staggered relation resting on said upper and lower chord members.

13. A wing for aircraft comprising a skeleton frame, a metallic fabric cover for the frame having adjacent edges at at least one portion of the frame and mechanical means connecting the said adjacent edges together, and drawing the said cover tight upon the frame.

14. A wing for aircraft having a frame, a flexible metallic fabric cover on said frame and mechanically operated tensioning means as a turnbuckle or the equivalent, for substantially uniformly tensioning the said cover in lateral and fore-and-aft directions.

15. In a wing for aircraft, the combination comprising upper and lower chord members, upper and lower rib members in staggered relation, said rib members crossing and seating upon the chord members and struts connecting the upper and lower rib members.

16. In a wing for aircraft, the combination comprising upper and lower chord members, upper and lower rib members in staggered relation, said rib members crossing and seating upon the chord members, struts connecting the upper and lower rib members and braces connecting the rib members with the chord members.

17. A wing for aircraft having longitudinally extending built up spars, comprising interbracing members therefor, said interbracing members diminishing in cross-sectional dimensions toward the wing tips, said spars being tapered in form and wall thickness, a series of ribs mounted on said spars forming the contour for the wing structure, a metallic fabric covering for the wing structure and mechanical means associated with the wing structure for tensioning the said covering over said structure.

In testimony whereof I have signed my name to this specification this 28th day of March, 1927.

EDMUND B. CARNS.